US007185277B1

(12) United States Patent
Bernstein et al.

(10) Patent No.: US 7,185,277 B1
(45) Date of Patent: Feb. 27, 2007

(54) METHOD AND APPARATUS FOR MERGING ELECTRONIC DOCUMENTS CONTAINING MARKUP LANGUAGE

(75) Inventors: Ethan Joseph Bernstein, Seattle, WA (US); Brian Jones, Redmond, WA (US); Marcin Sawicki, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 10/693,347

(22) Filed: Oct. 24, 2003

(51) Int. Cl.
*G06F 17/00* (2006.01)
(52) U.S. Cl. .................. 715/513; 715/530; 715/531
(58) Field of Classification Search ............... 715/513, 715/530
See application file for complete search history.

(56) References Cited

U.S. PATENT DOCUMENTS

| 5,630,138 | A | 5/1997 | Raman .................. 395/712 |
| 5,758,358 | A | 5/1998 | Ebbo .................... 707/203 |
| 5,828,885 | A | 10/1998 | Raman .................. 395/705 |
| 6,260,042 | B1 | 7/2001 | Curbera et al. .......... 707/101 |
| 6,565,609 | B1 * | 5/2003 | Sorge et al. ............ 715/503 |
| 6,848,078 | B1 * | 1/2005 | Birsan et al. ........... 715/511 |
| 6,886,130 | B1 * | 4/2005 | Unger et al. ............ 715/513 |
| 2001/0018697 | A1 * | 8/2001 | Kunitake et al. ......... 707/517 |

OTHER PUBLICATIONS

Microsoft Computer Dictionary, Fifth Edition, Microsoft Press, 2002, pp. 565.*
Lin, Shian-Hua, et al, "Poster Papers: Discovering Informative Content Blocks from Web Documents", Proceedings of the Eighth ACM SIGKDD International Conference on Knowledge Discovery and Data Mining, Jul. 2002, pp. 588-593.*
Harold, Elliotte, "Well-Formed HTML", downloaded frm http://www.developer.com/xml/print.php/784361, Jun. 2001, pp. 1-10.*
Myers, Eugene W., "An O(ND) Difference Algorithm and Its Variations," Department of Computer Science, University of Arizona.

* cited by examiner

*Primary Examiner*—William Bashore
*Assistant Examiner*—Laurie Ries
(74) *Attorney, Agent, or Firm*—Merchant & Gould

(57) ABSTRACT

A method and apparatus are provided for merging two electronic documents, one or both of which contain markup language. The source document and the destination document are compared to identify the matching blocks and the difference blocks. Each of the matching blocks containing a markup language tag for which only a start tag or an end tag has been matched are identified. The identified blocks are then split so that the matched markup language tags are no longer matched. All matching blocks are also split that contain a markup language tag for which either the start tag or the end tag has been matched to a different tag in the other document. Any matching blocks containing markup language tags that would create overlapping tags when merged are then split. The matching and difference blocks are then merged into a merged document in an order that ensures that all markup language tags contained in the merged document are well formed.

20 Claims, 11 Drawing Sheets

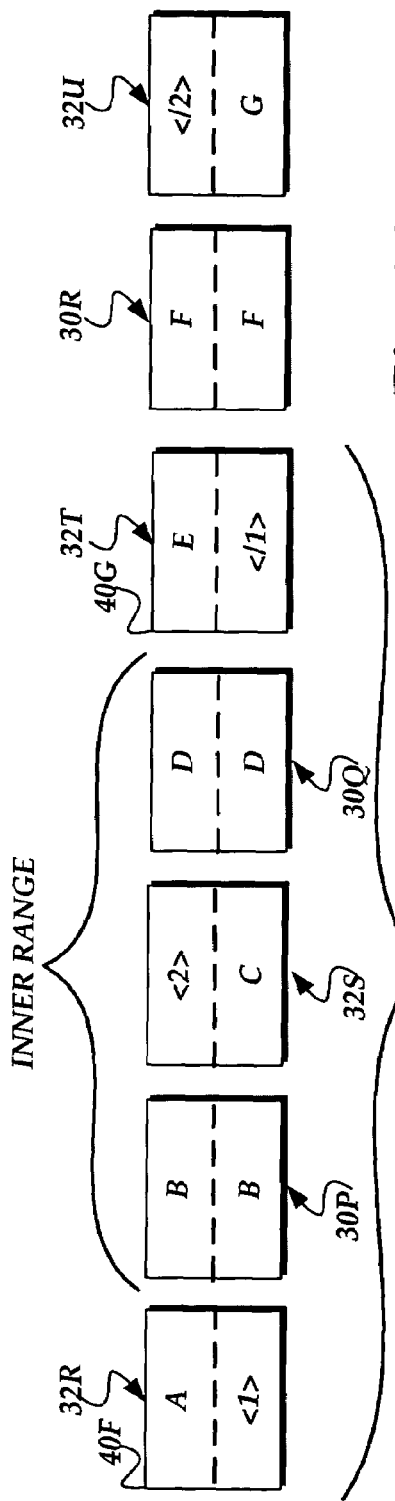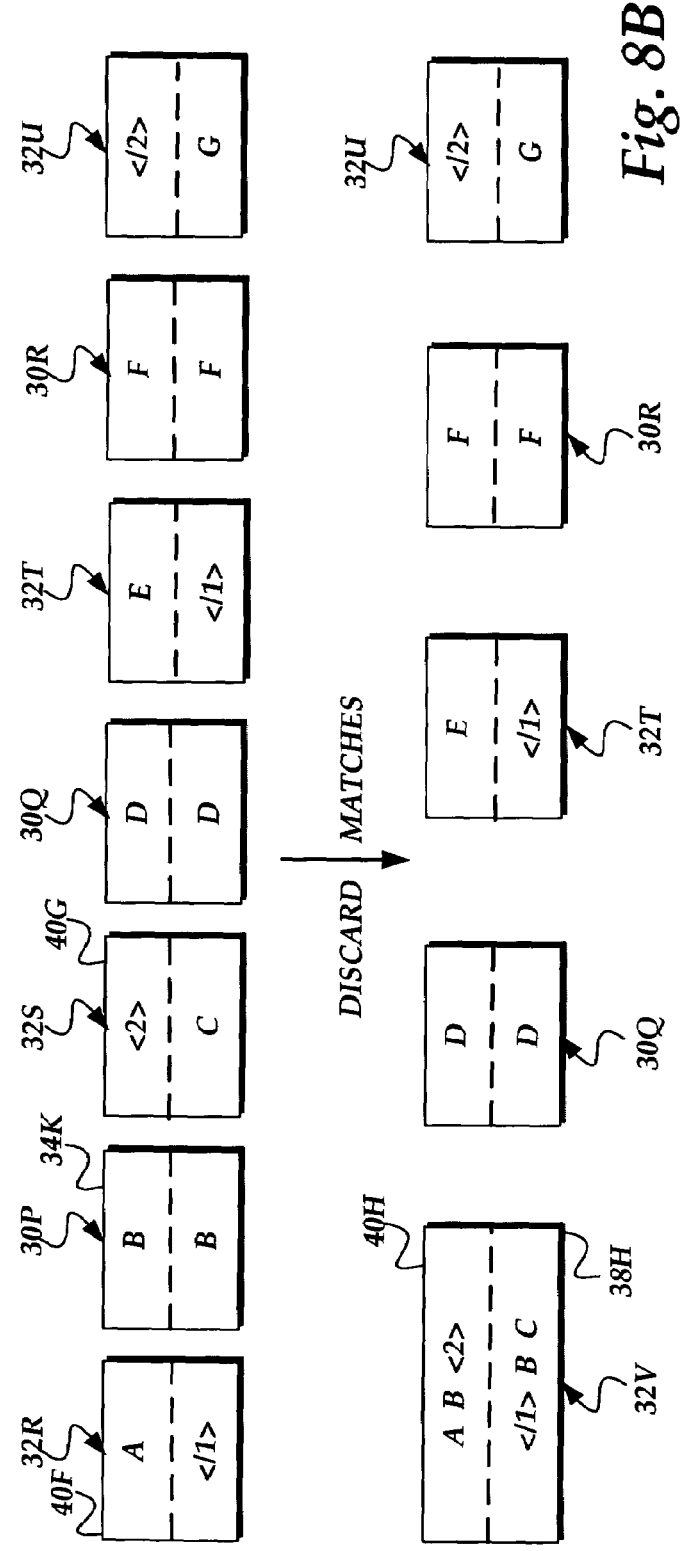

METHOD AND APPARATUS FOR MERGING ELECTRONIC DOCUMENTS CONTAINING MARKUP LANGUAGE

TECHNICAL FIELD

The invention generally relates to the field of electronic document processing and, more specifically, to the field of merging electronic documents that contain markup language.

BACKGROUND OF THE INVENTION

With the advent and explosion of the Internet, a number of technologies that facilitate the interchange of data have become widely utilized. One of these technologies, extensible markup language ("XML"), has become a foundational building block which makes possible a wide variety of different types of document processing and exchange. For instance, XML can be used to encapsulate any kind of structured information in order to pass the information between computing systems that would otherwise be unable to communicate.

In order to facilitate the creation and editing of documents containing XML, and other markup languages, software tools have been created or adapted to provide XML editing features. In particular, some word processing applications ("word processors") have been adapted to allow an XML schema to be attached to a word processing document. Once the XML schema has been attached, XML tags may be added to the data contained in the word processing document.

Many word processors also include functionality for comparing two electronic documents. During the compare process, the contents of a source document and a destination document are compared to identify the matching portions and the differing portions of the two documents. The contents of the source document are then merged into the destination document based upon the matching and differing portions. Optionally, the differing portions of the source document may be marked as revisions in terms of content inserted and content deleted. Based upon the results, a user can quickly determine the similarities and differences between two documents or versions of the same document.

Problems can occur when a word processor supports both the addition and editing of XML markup within an electronic document and comparing and merging two documents. These problems result from the fact that XML markup existing in a document must always follow certain structural and syntactical rules, called XML well formedness rules, to be considered valid. For instance, an XML start tag must always have a matching XML end tag and XML elements must be properly nested within one another and cannot overlap. If two documents containing XML markup were merged without regard to these restrictions, the XML markup in the resulting document could not be considered well formed XML, as it would be essentially corrupt. As a result, the word processor would not be able to save such a merged document as valid XML.

One obvious way to merge two documents to preserve XML well formedness is to simply append one document to the other document. However, this method is not very useful to a user because, although the well formedness of the XML is preserved, this method does not accomplish the goal of comparing the documents. Merging is valuable to a user because the documents are not just merged, but also compared, so that the contents that are the same do not have to be repeated in the merged document, while contents that are different can be highlighted to the user as being different and treated as insertions or deletions.

It is with respect to these considerations and others that the various embodiments of the present invention have been made.

SUMMARY OF THE INVENTION

In accordance with the present invention, the above and other problems are solved by a method and apparatus for merging two electronic documents, one or both of which contain XML markup, into a merged document. According to the method, the two documents may be compared and merged and any XML markup contained therein will also be compared and merged. Moreover, if the XML markup in the two documents is well formed, then the merged XML markup in the merged document will be well formed.

According to one aspect of the invention, a method is provided for merging two documents, one or both of which may contain XML markup tags. According to the method, a source document is merged into a destination document to create a merged document. Either the source document or the destination document, or both, may contain text and markup language tags, such as XML. The markup language tags (referred to as "tags" herein) may include a start tag, an end tag, or both. According to the one aspect of the method, the source document and the destination document are compared to identify the matching portions of the two documents (referred to herein as "matching blocks") and the differing portions (called "difference blocks" herein). Markup language tags are included in the comparison and are only matched if each aspect of a start or end tag in the source document exactly matches a corresponding markup language tag in the destination document. For instance, for two start tags to match, they must have the same name, namespace, attributes, and other associated values.

Once the document comparison has been performed, each of the matching blocks containing a markup language tag for which only a start tag or an end tag has been matched are identified. The identified blocks are then split so that the matched dangling tags are no longer matched. In this manner, each of the markup language tags for which only a start tag or an end tag has been matched is placed into a difference block. Additionally, all matching blocks are split that contain a markup language tag for which either the start tag or the end tag has been matched to a different tag in the other document. In this manner, any markup language tag matched to a different tag in the other document is placed in a difference block.

Once markup language tags matched to different tags have been placed in difference blocks, any matching blocks containing markup language tags that would create overlapping tags when merged are split. Overlapping tags occur when a start tag is placed inside another tag but the corresponding end tag is placed outside the other tag. They may also occur when a start tag is placed prior to the start tag of another tag, but the corresponding end tag is placed prior to the end tag for the other tag.

In order to split matching blocks containing markup language tags that would create overlapping tags when merged, each difference block is processed. In particular, for each difference block a determination is made as to whether a markup language tag from the source document has a start tag but not an end tag in the difference block. If a difference block has a start tag but not an end tag, the difference block containing the matching end tag in the source document is located. An "inner range" is then identified comprising the matching and difference blocks between the difference block containing the matching start tag and the difference block containing the matching end tag. An "outer range" is also identified that comprises the difference block containing the start tag, the difference block that contains the end tag, and all of the matching and difference blocks in between.

Once the inner and outer ranges have been identified, each of the markup language tags that has a start tag within the inner range and an end tag outside the inner range are identified. For each such tag, all of the matching blocks within the inner range prior to the start tag are marked as difference blocks. Additionally, each of the markup language tags that has an end tag within the inner range and a start tag outside the outer range are identified. For each such tag, all matching blocks within the inner range after the end tag are marked as difference blocks. In this manner, any matching tags that would create overlapping tags when merged are placed into difference blocks.

Once the matches that would create overlapping tags have been eliminated, the contents of the matching and difference blocks are merged into a merged document in an order that ensures that all markup language tags contained in the merged document are well formed. In particular, each matching and difference block is processed in order. For each matching block, text from the source or destination document is copied into the merged document. For each difference block, text from the source or destination document is copied into the merged document if the difference block contains text only from either the source or destination document. If the difference block contains text from both the source or destination documents, but does not contain a markup language tag having only a start tag or an end tag in the difference block, text from the source or destination document may be copied into the merged document prior to the text from the other document.

If a difference block contains text from either document that includes a markup language tag having only a start tag or an end tag in the difference block, a label is created for each markup language tag. The label comprises a non-zero integer that identifies the number of matching or difference blocks to the difference block containing the matching start or end tag. A sub-block is then created for each unique label, each sub-block containing the markup language tags and text from either the source or destination document having a corresponding label. Each of the sub-blocks are then arranged in order, with negative labels first in decreasing order and then positive labels in decreasing label order.

The text contained in each sub-block is then copied into the merged document in the arranged order. Text from the source document is copied just prior to or just after text from the sub-block in the destination document. If the sub-block has a negative label, text in the sub-block is copied into the merged document just prior to the text from the sub-block in the destination document. If the sub-block has a positive label, text in the sub-block is copied into the merged document just after the text from the sub-block in the destination document.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE DRAWINGS

FIGS. 6, 8A–8B, and 10 are block diagrams illustrating the application of the process shown in FIGS. 5,7, and 9A–9B to several illustrative source and destination documents according to the various embodiments of the invention.

DETAILED DESCRIPTION OF THE INVENTION

Figure 1:
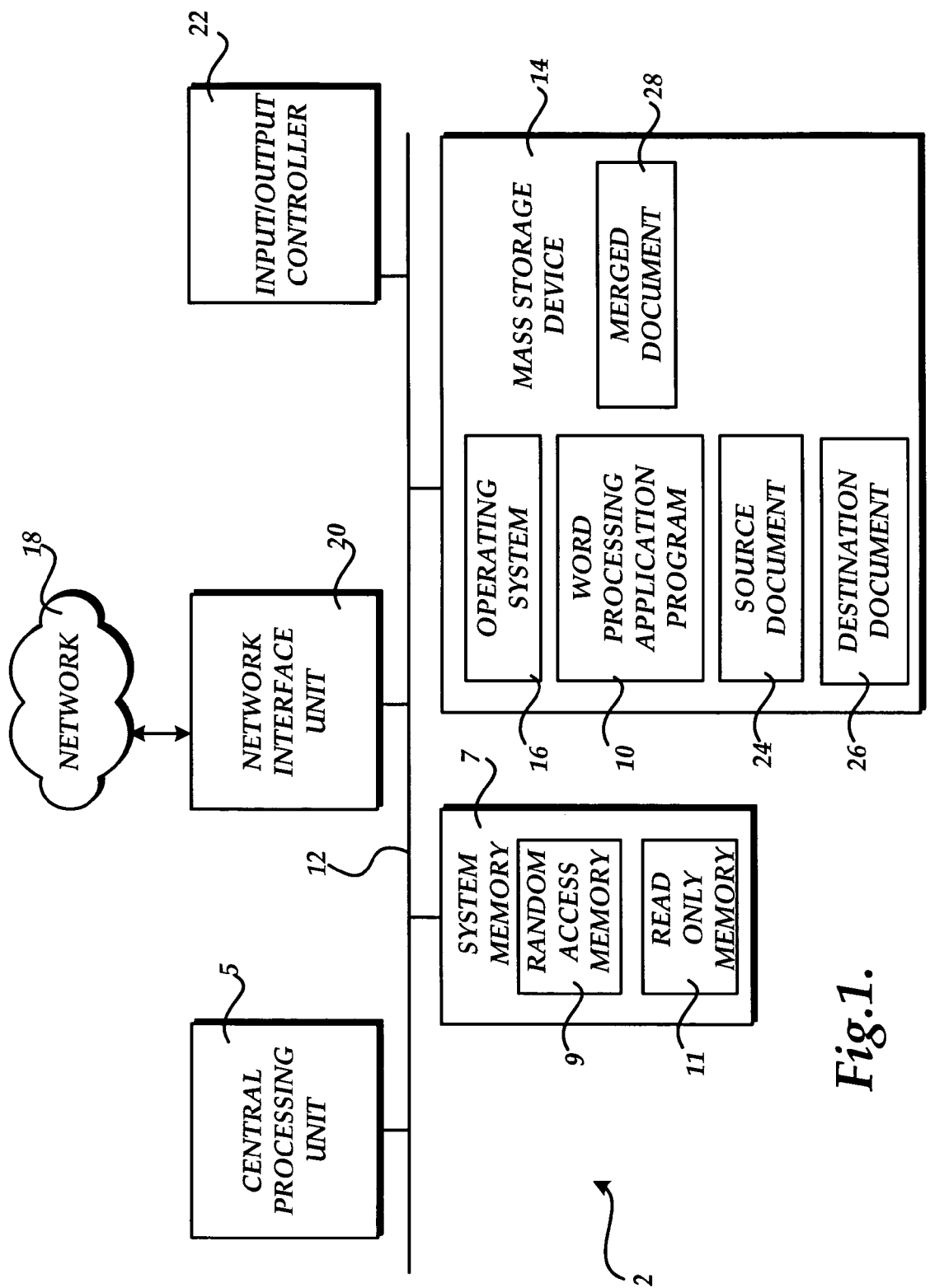
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 10. As known to those skilled in the art, the word processing application program 10 is operative to provide functionality for creating and editing electronic documents, such as the source document 24 and the destination document 26. According to one embodiment of the invention, the word processing application program 10 comprises the WORD word processing application program from MICROSOFT CORPORATION. It should be appreciated, however, that other word processing application programs from other manufacturers may be utilized to embody the various aspects of the present invention.

In conjunction with the editing of a word processing document, the word processing application program 10 provides functionality for allowing a user to add markup language tags to the document. For instance, according to embodiments of the invention, a user may attach an XML schema to a word processing document. The user may then mark up the word processing document with XML tags. In this manner, markup language tags may be added to any content contained within the word processing document. Moreover, XML may be utilized to represent one or more native data structures utilized by the word processing application program 10. For instance, XML may be utilized to identify rich formatting, tables, and other content within a word processing document.

According to various embodiments of the invention, the word processing application program 10 is also operative to provide functionality for merging two word processing documents. During the compare process, the contents of a source document 24 and a destination document 26 are compared to identify the matching portions and the differing portions of the two documents. The contents of the source document 24 are then merged into the destination document 26 based upon the matching and differing portions. Optionally, the differing portions of the source document 24 may be marked as revisions in terms of content inserted and content deleted. Based upon the results, a user can quickly determine the similarities and differences between two documents or versions of the same document.

As discussed briefly above, several problems can occur when a word processing application program 10 supports the ability to mark up a word processing document with XML and the ability to merge documents. These problems stem from the fact that traditional algorithms for merging electronic documents are not suited for merging documents that contain markup language. As a result, the resulting merged document will contain markup language that is not well formed. With respect to XML, well formedness means that every start tag must have an end tag, each end tag must have a start tag, and that no elements can overlap (if one element starts inside of another, then it must end still inside of that element). If these rules are not met, the XML contained in the merged document cannot be considered well formed.

Figure 2:
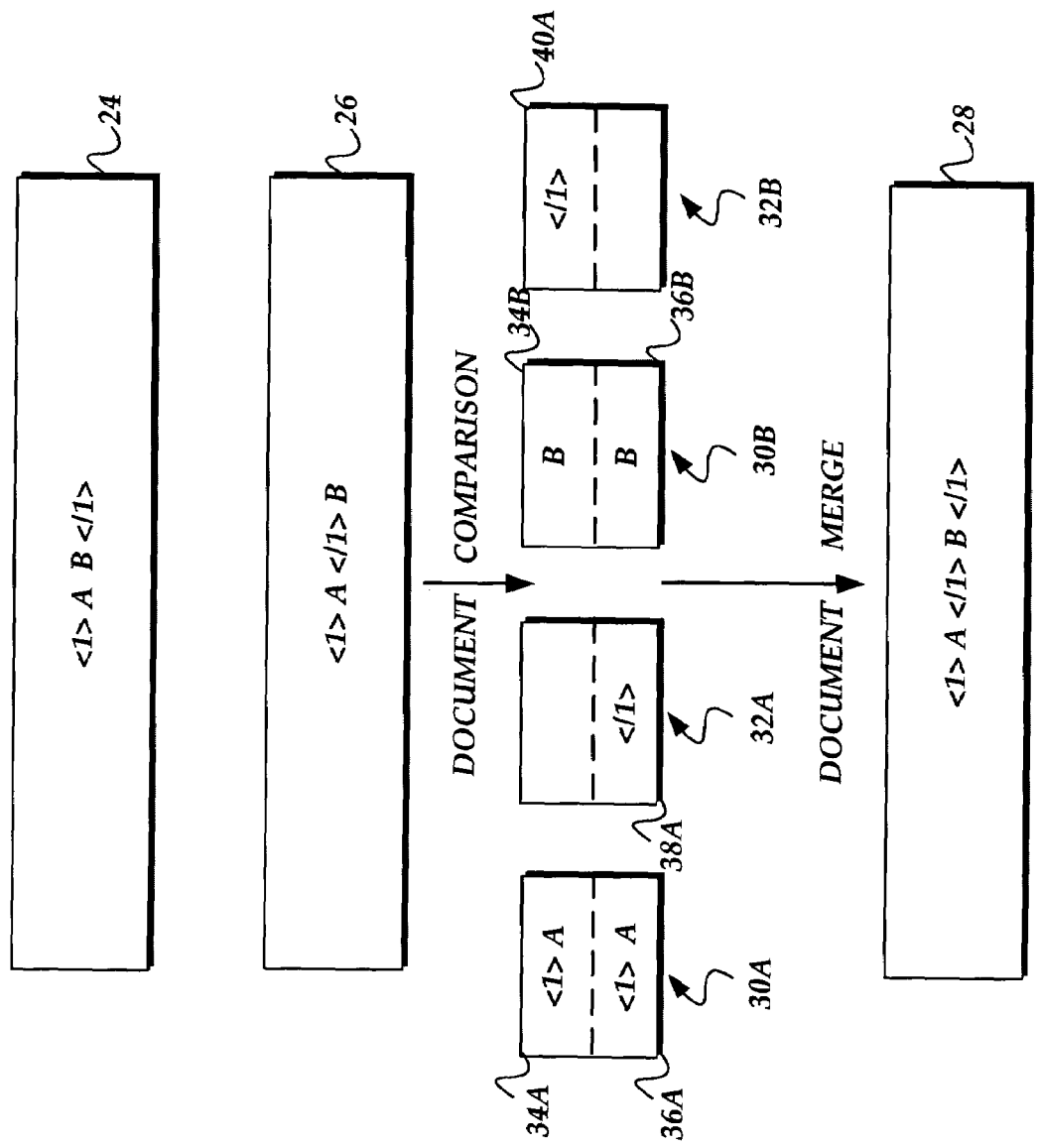
FIGS. 2–4 are block diagrams illustrating several problems that may be encountered when merging documents containing markup language.
Figure 3:
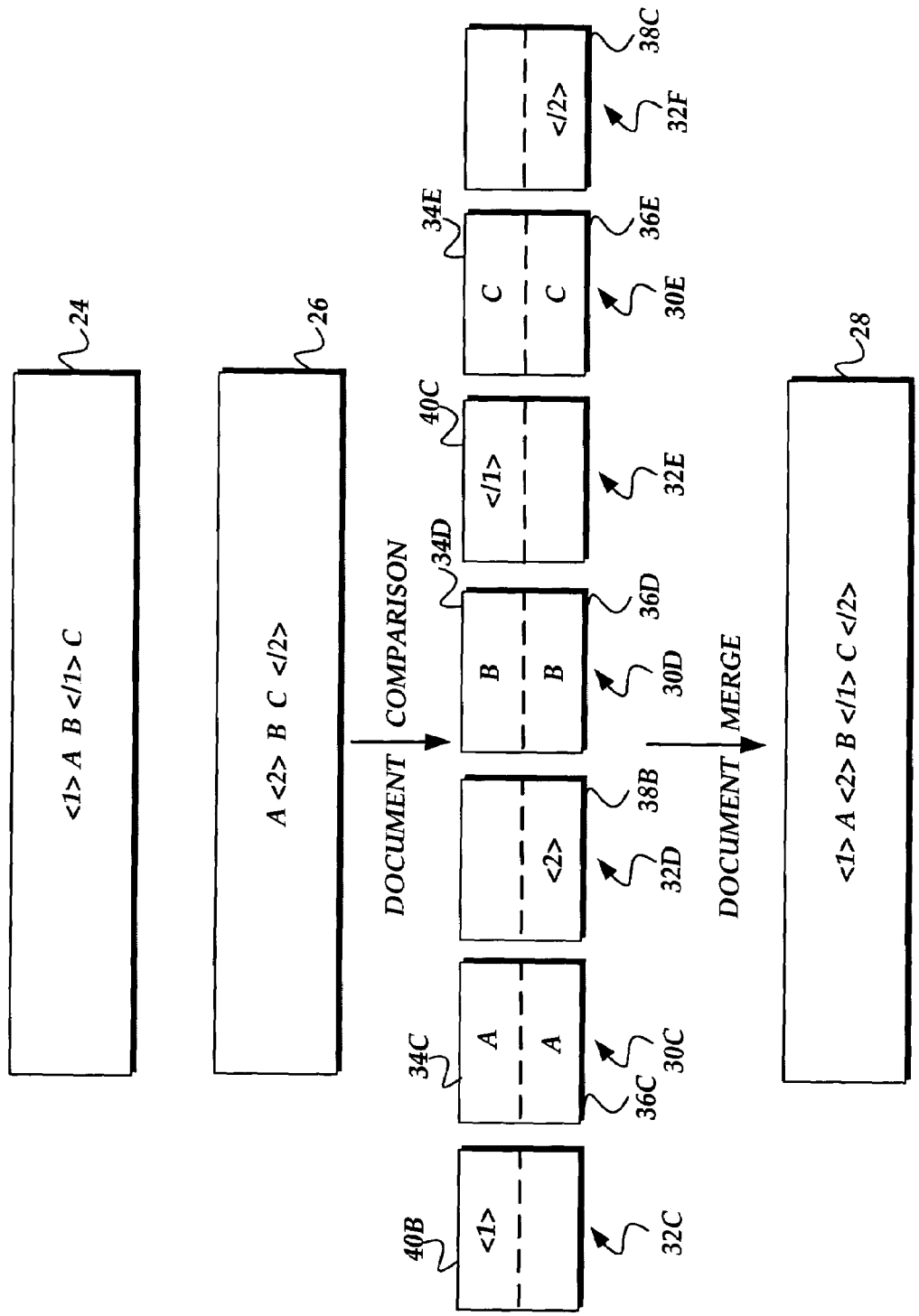
Figure 4:
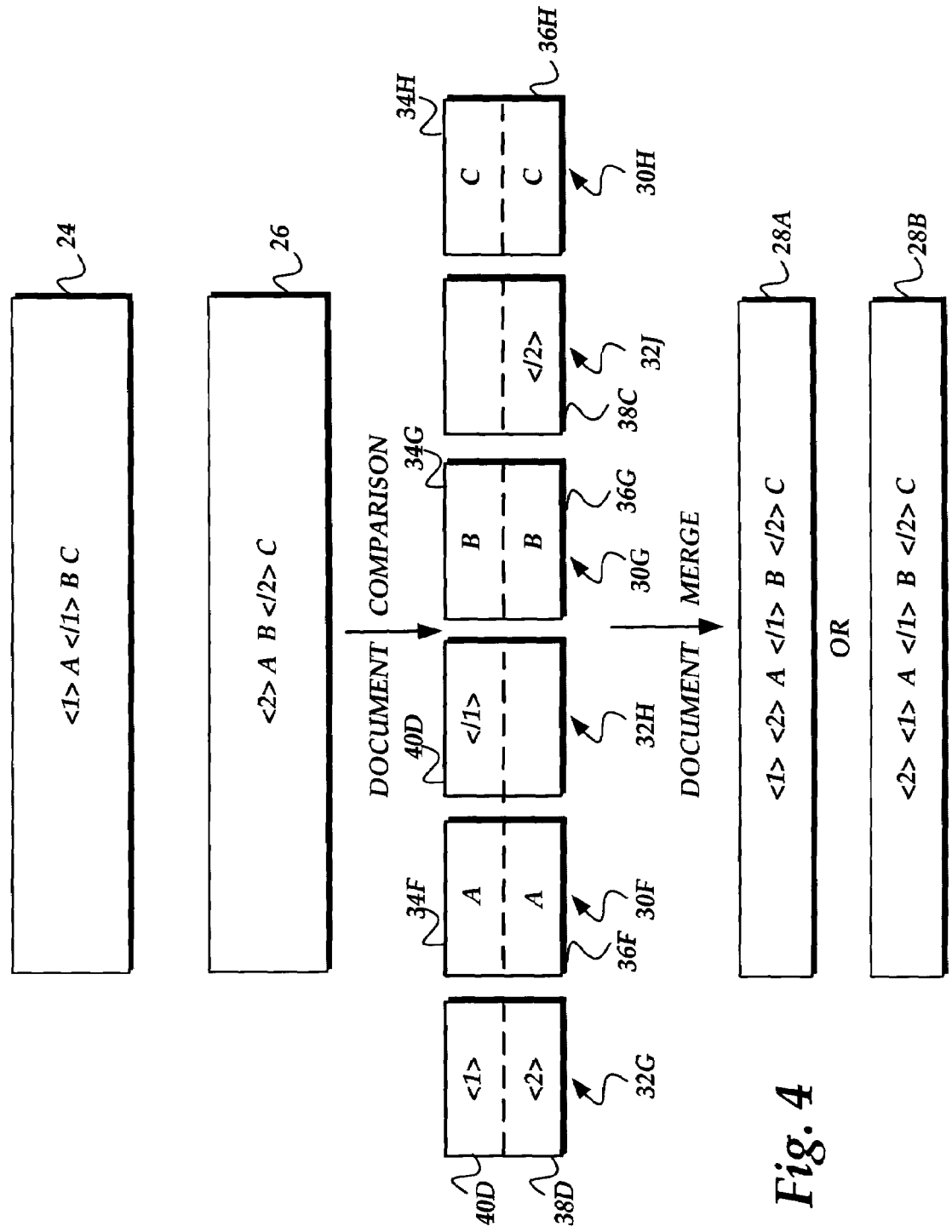

FIGS. 2–4 are block diagrams illustrating several problems that may be encountered when merging documents containing markup language utilizing a traditional merge algorithm. FIG. 2 illustrates a problem case where the merged document contains two start or end tags, FIG. 3 illustrates a problem case where overlapping tags are created in the merged document, and FIG. 4 illustrates a problem case where overlapping tags may be created in the merged document depending upon how the text in the individual documents is ordered during the merge. It should be appreciated that the algorithms provided herein, and described in greater detail below, would created well formed XML in the merged document for any of the illustrated problem cases.

Referring now to FIG. 2, the problem case wherein the merged document contains two start or two end tags will be described. As shown in FIG. 2, a source document 24 and a destination document 26 may contain XML tags. In response to a request at the word processing application program 10, the contents of the source document 24 are merged into the contents of the destination document 26. In order to perform the merger, a document comparison is made between the source document 24 and the destination document 26. During the comparison process, the contents of the source document 24 and the destination document 26 are compared to identify the matching portions and the differing portions of the two documents. In particular, a number of matching blocks 30A–30B are created that contain the content that matches between the source and destination documents. For instance, the matching block 30A includes the content 34A ("<1>A") from the source document 24 and the content 36A

("<1>A") from the destination document 26, which are identical. Similarly, the matching block 30B includes the content 34B ("B") from the source document 24 and the matching content 30B from the destination document 26. It should be appreciated that the content may comprise either text or XML.

During the comparison process, a number of difference blocks 32A–32B are also identified. The difference blocks contain the content that is different between the source document 24 and destination document 26. As shown in FIG. 2, the difference block 32A includes the content 38A ("</1>") from the destination document 28 and the difference block 32B includes the content 40A ("</1>") from the source document 24. It should be appreciated that, throughout the several drawings, the top portion of the difference and matching blocks shows content from the source document 24 and the bottom portion of the difference and matching block shows content from the destination document 26.

Once the matching and difference blocks have been identified, they may be merged in order to create the merged document. Using a traditional algorithm for performing such a merger results in the merged document 28. As shown in FIG. 2, the merged document 28 includes, in order, the contents of the matching block 30A, the difference block 32A, the matching block 30B, and the difference block 32B. However, because the traditional algorithms for performing such a merger are not suited for use with documents containing XML, the contents of the merged document 29 are not well formed. In particular, the XML contained in the merged document 28 includes one start tag ("<1>"), but has two end tags ("</1>"). Accordingly, the merged document 29 does not contain well formed XML.

Turning now to FIG. 3, another shortcoming of the prior methods for merging two documents will be described. In the example illustrated in FIG. 3, the contents of the source document 24 and the destination document 26 have been changed. In this example, the document comparison results in difference blocks 32C–32F and matching blocks 30C–30E. In particular, the difference block 32C contains content 40B ("<1>") from the source document 24, the difference block 32D contains content 38B ("<2>") from the destination document 24, the difference block 32E contains content 40C ("</1>") from the source document 24, and the difference block 32F contains content 38C ("</2>") from the destination document 26. The matching block 30C contains content 34C and 36C ("A") from the source and destination documents, the matching block 30D contains content 34D and 30D ("B") from the source and destination documents, and the matching block 30E contains content 34E and 36E ("C") from both documents.

When a traditional merge operation is performed on the matching blocks 30C–30E and difference blocks 32C–38C, the merged document 28 shown in FIG. 3 is generated. As with the previous example, however, because the matching and difference blocks are simply merged in order, the merged document 28 contains non well formed XML. In particular, the merged document 28 includes overlapping tags. The start tag identified in difference block 32D ("<2>") begins before the start tag identified in difference block 40B ("<1>") has ended. In this example, this result will occur regardless of the ordering of the text in the individual difference blocks is ordered during the merge.

Turning now to FIG. 4, another shortcoming of the prior solutions for merging documents will be described. In this example, the merged document may or may not contain well formed XML depending on the order chosen for the content contained in the difference blocks. Because traditional algorithms do not account for the presence of XML, no guarantee can be made as to whether the merged document will contain well formed XML.

As shown in FIG. 4, a document comparison between the illustrative source document 24 and the destination document 26 results in the difference blocks 32G–32J and the matching blocks 30F–30H. The difference block 32G includes content 40D ("<1>") from the source document 24 and content 38D ("<2>") from the destination document 26, the difference block 32H contains content 40D ("</1>") only from the source document 24, and the difference block 32J contains content ("</2>") only from the destination document 26. The matching block 30F contains content 34F and 36F ("A") from both documents, the matching block 30G contains content 34G and 36G ("B") from both documents, and the matching block 30H contains content 34H and 36H ("C") from both documents.

When the matching blocks 30F–30H and the difference blocks 32G–32J are merged, it should be appreciated that a choice must be made as to whether the content 40D is placed prior to the content 38D in the difference block 32G, or vice versa. Depending upon the decision, the contents of the merged document may or may not be well formed. For example, if the content 40D is placed prior to the content 38D in the merged document 28A, the XML will be poorly formed because an overlapping tag will be present in the merged document 28A. However, if the content 40D is placed after the content 38D in the merged document 28B, the contents of the merged document will be well formed. However, because traditional comparison and merge algorithms are not suited to handle documents containing markup language, this decision is an arbitrary one. Therefore, if this case is presented, there can be no guarantee that the merged document will contain well formed XML.

It should be appreciated that the embodiments of the invention solve the problems described above with respect to FIGS. 2–4. It should further be appreciated that the embodiments of the invention also solve other problems not described herein by providing a solution that guarantees that well formed XML will be presented in a merged document created as a merger of a source and destination document with no poorly formed XML. Details regarding the construction, operation, and use of the invention are provided below with respect to FIGS. 5–10.

Figure 5:
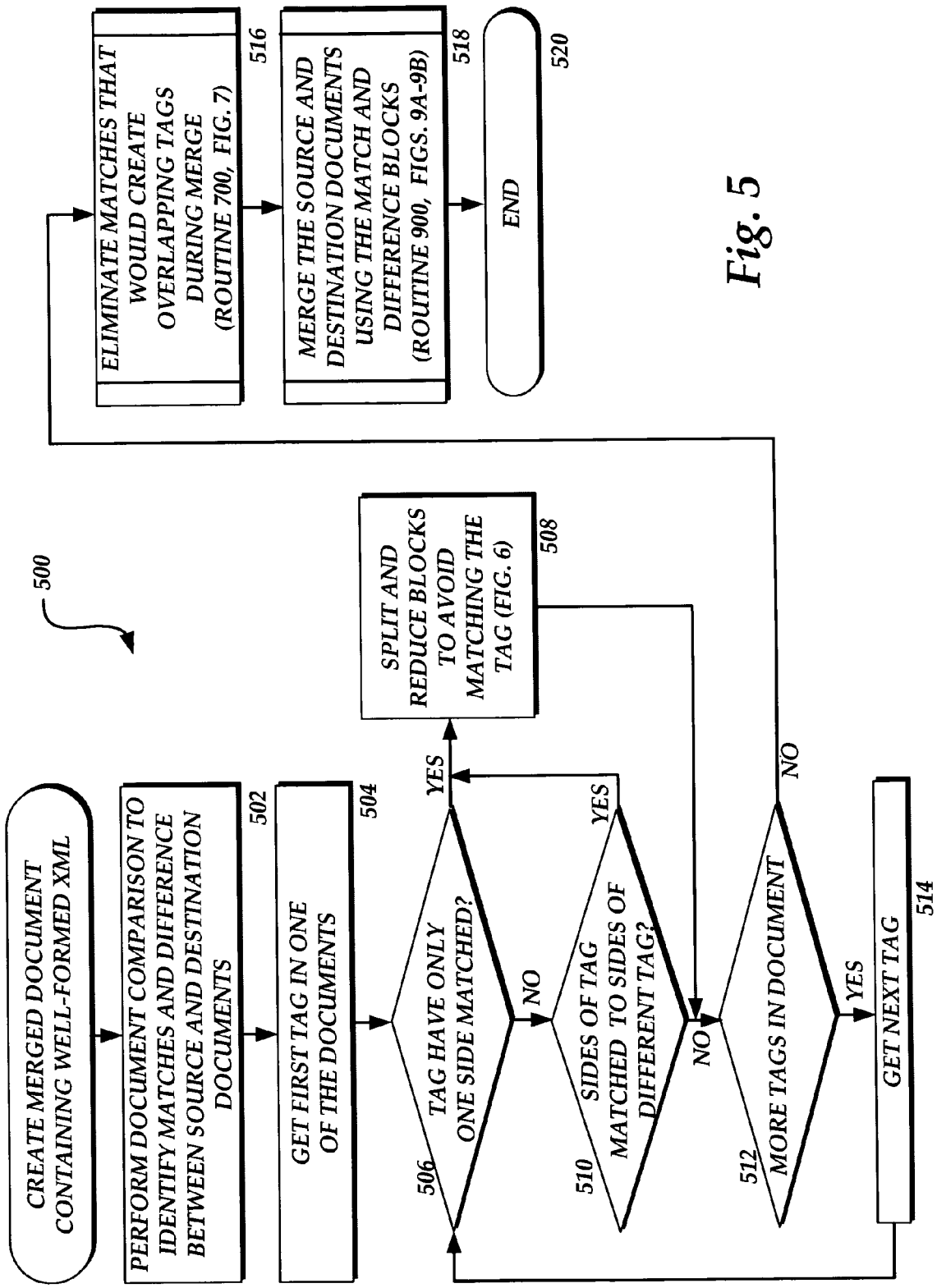
FIGS. 5, 7, and 9A–9B are flow diagram illustrating aspects of a process for merging documents containing markup language according to various embodiments of the invention.

Referring now to FIG. 5, an illustrative routine 500 will be described illustrating a process performed by a word processing application program 10 for merging two documents that include XML markup language. It should be appreciated that although the embodiments of the invention described herein are presented in the context of a word processing application program 10, the invention may be utilized in other types of application programs that support the use of XML or other types of markup languages and the ability to merge documents. For instance, the embodiments of the invention described herein may be utilized within a spreadsheet application program, a presentation application program, a drawing or computer-aided design application program, or a database application program.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 5, 8, and 10A–10B, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

The routine 500 begins at comparison operation 502 where a document comparison is performed to identify the matches and differences between the source document 24 and the destination document 26. According to one embodiment of the invention, the algorithm for performing the document comparison comprises the well-known comparison algorithm described by Eugene W. Myers in the publication "An (O)(ND) Difference Algorithm and Its Variations", which is expressly incorporated herein by reference. It should be appreciated, however, that the comparison algorithm may comprise another type of comparison algorithm that not only compares the content of the documents but also deals with the consistency of other types of structures within the documents (e.g. tables). The result of this comparison is a series of matches which are in the same order in each document. This process is also referred to as a locating a "common subsequence," which refers to finding a set of matching characters which are in the same order in each document.

It should be appreciated that the comparison algorithm is also modified to account for the presence of XML tags within the each of the documents. In particular, the algorithm is modified to appropriately match starting and ending tags in the source and destination documents. To accomplish this, XML start and end tags are essentially treated as individual characters. Start and end tags are only matched if each aspect of the tag matches each aspect of the tag in the other document. In particular, two elements can be considered a match only if their tag names are the same, their namespaces are the same, they have all of the same attributes, all of the attribute values are the same, and all of the attribute namespaces are the same. Otherwise, the elements will be considered different by the comparison algorithm.

Once the matching blocks and difference blocks have been identified, all of the tags in one of the document are examined to determine if the tags have only one side matched or if the tag is matched to the sides of two different tags in the other document. If either of these conditions are identified, the matching blocks containing the matched tags are split so that the matched tag is no longer matched. To perform this process, the routine 500 continues from comparison operation 502 to processing operation 504. At processing operation 504, a first tag is identified in either the source or destination document. The routine 500 then continues to decision operation 506, where the word processing application program 10 determines whether the markup language tag has only one side matched (i.e. either only a start tag or an end tag). If the markup language tag only has one side matched, the routine 500 branches from decision operation 506 to processing operation 508. Otherwise, the routine 500 continues from decision operation 506 to decision operation 510.

At decision operation 510, the word processing application program 10 determines whether the sides of the current markup language tag have been matched to the sides of a different tag in the other document. If such a match has been made, the routine 500 branches from decision operation 510 to processing operation 508. Otherwise, the routine 500 continues to decision operation 512, where a determination is made as to whether additional markup language tags exist in the document. If additional tags exist, the routine 500 continues to processing operation 514, where the next tag in the current document is identified. The routine then returns to operation 506 where the above-described analysis is performed on the next tag. If, at operation 514, it is determined that no additional tags exist, the routine 500 continues to operation 516.

Figure 6:
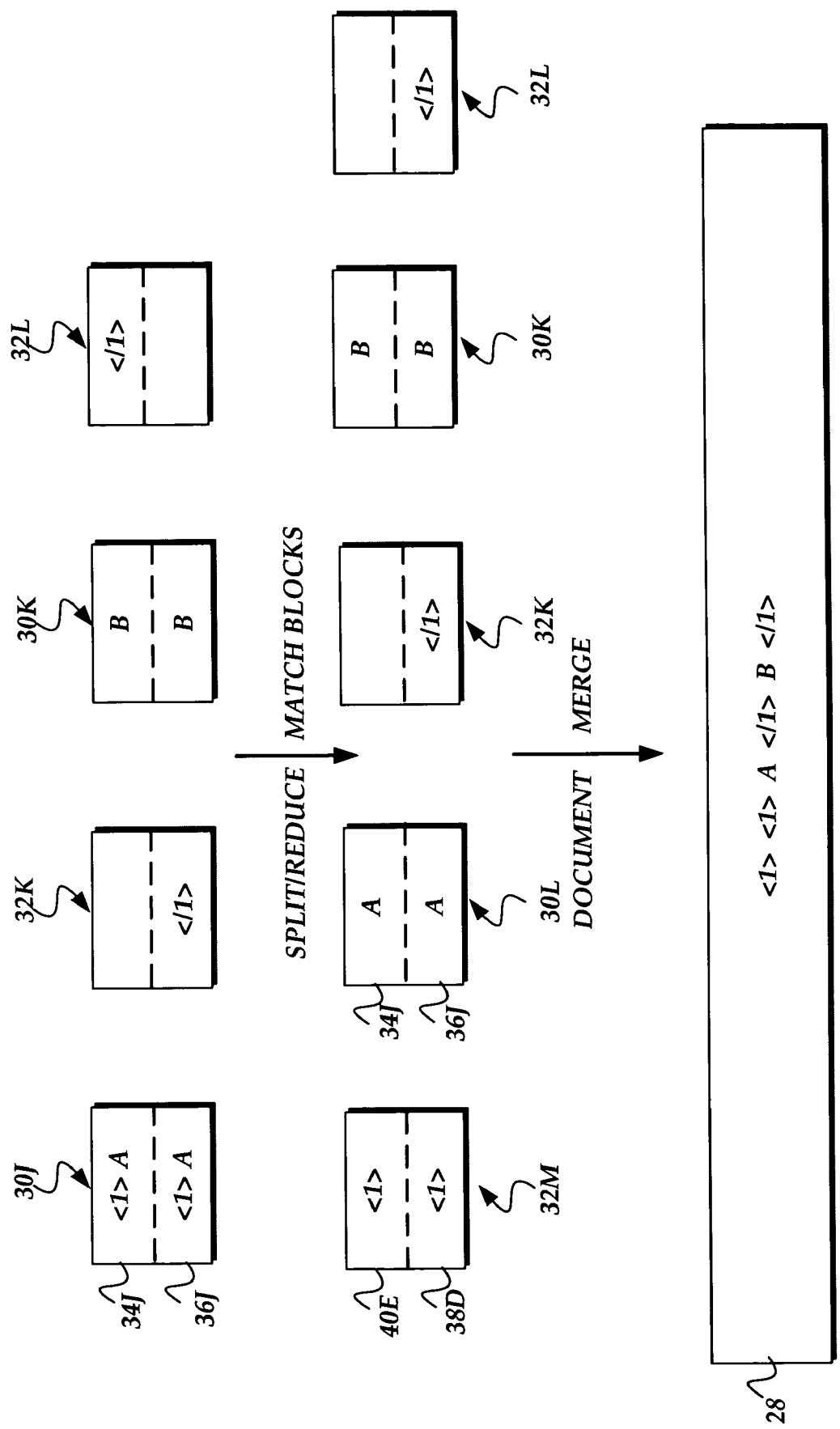

As described above, the routine 500 branches to processing operation 508 if a tag has only one side matched or if the sides of a markup language tag has been matched to the sides of a different tag in the other document. At processing operation 508, the matching block containing the matched tag is split so that the markup language tag is no longer matched. FIG. 6 illustrates the process for splitting and reducing the matching blocks so that the tag is no longer matched using the example matching blocks and difference blocks from FIG. 2, described above. As shown in FIG. 6, the document comparison resulted in the matching blocks 30J–30K and the difference blocks 32K–32L. If the matching and difference blocks were simply merged, as described above with respect to FIG. 2, the merged document would include two end tags. Therefore, because only one side of the tag ("<1>") contained in the matching block 30J has been matched, the matching block 30J has been split and reduced.

By splitting and reducing the matching block 30J, two new blocks are created. In particular, a difference block 32M is created that includes content 40E ("<1>") from the source document 24 and content 38D ("<1>") from the destination document. A matching block 30L is also created that includes content 34J and 36J from both the source and destination documents, respectively. In this manner, when the difference blocks and matching blocks are merged, in order, the resulting merged document 28 includes well formed XML that includes two valid nested tags rather than a poorly formed single tag with two end tags (as shown in FIG. 2).

As discussed briefly above, when operations 506, 508, 510, and 512 have been completed for each tag in one of the documents, the routine 500 branches from decision operation 512 to processing operation 516. At processing operation 516, the matching blocks are again processed, this time to identify any matches that would create overlapping tags when the matching blocks and the difference blocks are merged to create the merged document. An illustrative routine for eliminating matches that may create overlapping tags is described in greater detail below with respect to FIG. 7.

Once matches that may create overlapping tags have been eliminated at operation 516, the routine 500 continues to processing operation 518. At operation 518, the content from the source and destination documents in the matching blocks and difference blocks is merged together to form the merged document. In particular, the content is merged in a manner that will ensure that the merged document contains XML that is well formed. In order to accomplish this, the difference and matching blocks are taken in order. For each matching block, content from either the source or destination document is copied into the merged document. For each difference block that contains content from only one document, the content is copied into the merged document. However, for difference blocks that contain content from both documents, a choice must be made as to the ordering of the content. One solution is to place all of the content in the difference block from one document directly before or directly after all of the content from the other document in the difference block. The content from each document may also be more generally interleaved to ensure that all of the XML in the merged document is well formed. An illustrative routine for merging the matching and difference blocks will be described in greater detail below with respect to FIGS. 9A–9B. Once the documents have been merged in the manner described with respect to FIGS. 9A–9B, the merged document will contain well formed XML and will be complete. Accordingly, from processing operation 518, the routine 500 continues to operation 520, where it ends.

Figure 7:
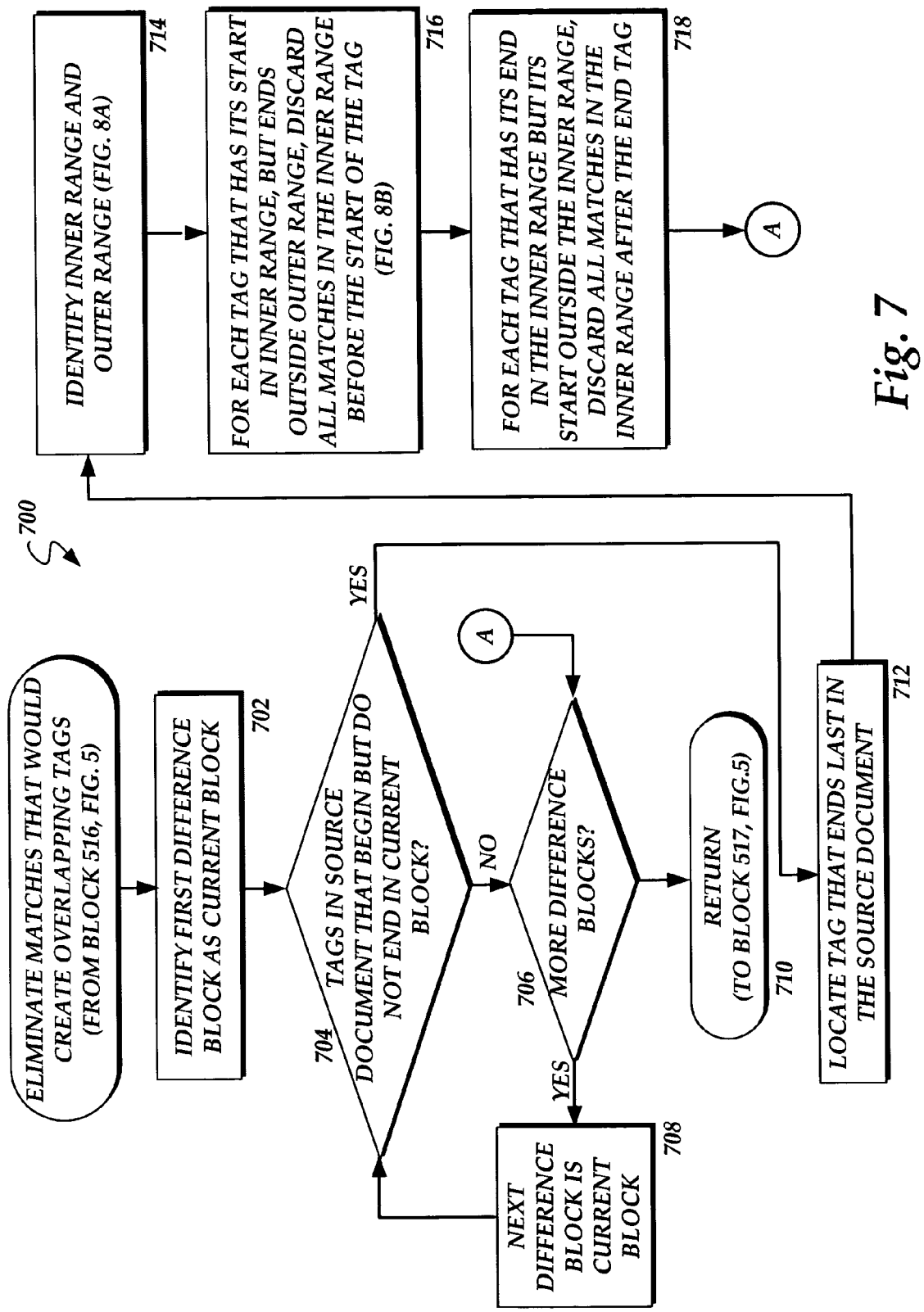

As discussed briefly above with respect to FIG. 5, the routine 700 shown in FIG. 7 illustrates a process for splitting matching blocks that contain markup language tags that would create overlapping tags in the merged document if merged. To perform this process, the word processing application program 10 first steps through the difference blocks to determine if content is contained in a difference block from the source document 24 that includes a start tag that begins but does not end in the difference block. Accordingly, the routine 700 begins at processing operation 702, where the first difference block is identified as the current block. The routine 700 then continues to decision operation 704, where a determination is made as to whether the current difference block includes one or more tags from the source document 24 that have a start tag but not an end tag in the current difference block. If the current difference block does not include a start tag from the source document 24 without the matching end tag, the routine 700 continues to decision operation 706, where a determination is made as to whether there are additional difference blocks to process. If additional difference blocks remain, the routine branches to processing operation 708, where the next difference block is identified as the current difference block. Otherwise, the routine 700 continues to operation 710, where program control returns to operation 517, shown in and discussed above with respect to FIG. 5.

If, at decision operation 704, the word processing application program 10 determines that the current difference block includes a tag from the source document 24 that has a start tag but not an end tag in the current difference block, the routine 700 branches from operation 704 to operation 712. At processing operation 712, the furthest difference block is located that contains the matching end tag for such a tag in the current difference block. The difference block that is the furthest away and contains the matching end tag may be referred to herein as the "furthest difference block." The routine 700 then continues to operation 714, where an "inner range" and an "outer range" of matching and difference blocks is identified. The inner range is identified as the range of matching and difference blocks between the current difference block and the furthest difference block. The outer range is identified as the range of matching and difference blocks including the current difference block and the furthest difference block and each of the matching and difference blocks in between.

The matching blocks 30P–30R and difference blocks 32R–32U shown in FIG. 8A illustrate the process for identifying the inner and outer ranges. As shown in FIG. 8A, the difference block 32R contains content 40F ("</1>") in the source document that includes a start tag but not the matching end tag. The matching end tag is contained in the difference block 32T. Accordingly, the inner range comprises all of the matching and difference blocks between the difference block 32R and the difference block 32T. The outer range comprises all of the matching and difference blocks between the blocks 32R and 32T and also includes the difference blocks 32R and 32T. The outer and inner ranges may then be utilized to identify and eliminate matches that would create overlapping tags. This process is described below.

Once the inner and outer ranges have been identified, the routine 700 continues to processing operation 716. At operation 716, the matching blocks in the inner range are processed. In particular, matching blocks in the inner range are discarded if they precede a start tag that exists within the inner range but corresponds to a matching end tag that exists outside the outer range. "Discarding" a matching block means that the matching block is marked as a difference block and may be combined with any other adjacent difference block. For instance, as shown in FIG. 8B, the inner range comprises the blocks 30P, 32S, and 30Q and the outer range comprises the blocks 32R, 30P, 32S, 30Q, and 32T. The difference block 32S includes a tag ("<2>") that begins inside the inner range but has a matching end tag that is outside the outer range (the matching end tag is in difference block 32U, which is outside the outer range). Accordingly, as shown in FIG. 8B, any matching blocks prior to the tag must be discarded. In the example shown in FIG. 8B, the matching block 30P occurs prior to the block 32S containing the tag. Accordingly, the matching block 30P is discarded (marked as a difference block) and combined with the difference blocks on either side (blocks 32R and 32S). This results in the creation of the difference block 32V, which contains content 40H from the source document and content 38H from the destination document which was previously contained in blocks 32R, 30P, and 32S.

Referring again to FIG. 7, once the processing operation 716 has completed, the routine 700 continues to processing operation 718. At operation 718, matching blocks are discarded that are located in the inner range and that follow an end tag that exists in the inner range but that has its corresponding start tag outside the outer range. Once this process has been completed, the routine 700 continues from processing operation 718 to operation 706, where any remaining difference blocks are processed in the manner described above.

As described briefly above with respect to FIG. 5, the routine 900 illustrates a process for copying the content from each matching and difference block to the merged document in a manner that ensures that the contents of the merged document 28 will be well formed. This process will now be described in detail with reference to FIGS. 9A–9B and 10. In particular, the matching and difference blocks are processed in order to copy their contents to the merged document 28. Accordingly, the routine 900 begins at processing operation 902, where the first difference or matching block is identified as the current block. The routine 900 then continues to decision operation 903, where a determination is made as to whether the current block is a matching block. If the current block is a matching block, the routine 900 branches from decision operation 903 to process operation 906, where the contents of the current block are copied to the merged document 28.

If, at decision operation 903, it is determined that the current block is not a matching block, then the current block must be a difference block. Accordingly, if such a determination is made, the routine 900 continues from operation 903 to operation 904, where a determination is made as to whether the current block includes content from only either the source document 24 or the destination document 26. If the current block includes content from only one document, then the routine 900 branches to operation 906, where the content from the current block is copied into the merged document 28. If the current block includes content from both the source document 24 and the destination document 26, the routine continues from operation 904 to decision operation 908.

At decision operation 908, a determination is made as to whether the current block contains a markup language tag that has a matching side that is not contained in the difference block. Such a tag may be referred to herein as a "dangling tag" and may occur, for instance, where a start tag or an end tag in the current block has a matching start tag or end tag in another difference block. If such a tag is not identified in the current block, the routine 900 branches to processing operation 910, where content from one document in the current block is copied into the merged document 28 prior to the content from the other document. For instance, content from the source document may be copied into the merged document 28 prior to content from the destination document 26, or vice versa. Because the current block does not include a dangling tag, the order in which the content is copied into the merged document 28 from the source and destination documents does not matter.

Figure 9A:
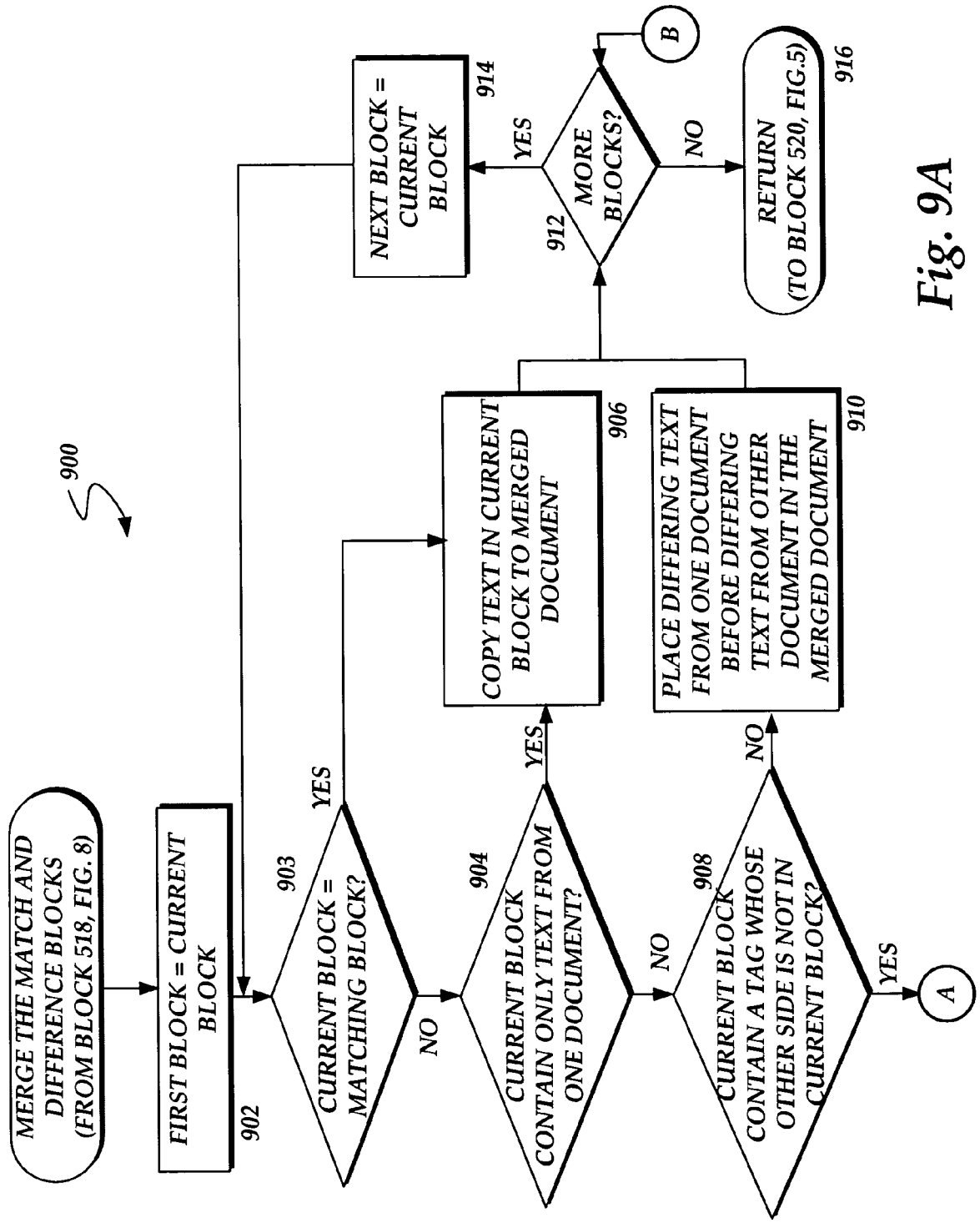
Figure 9B:
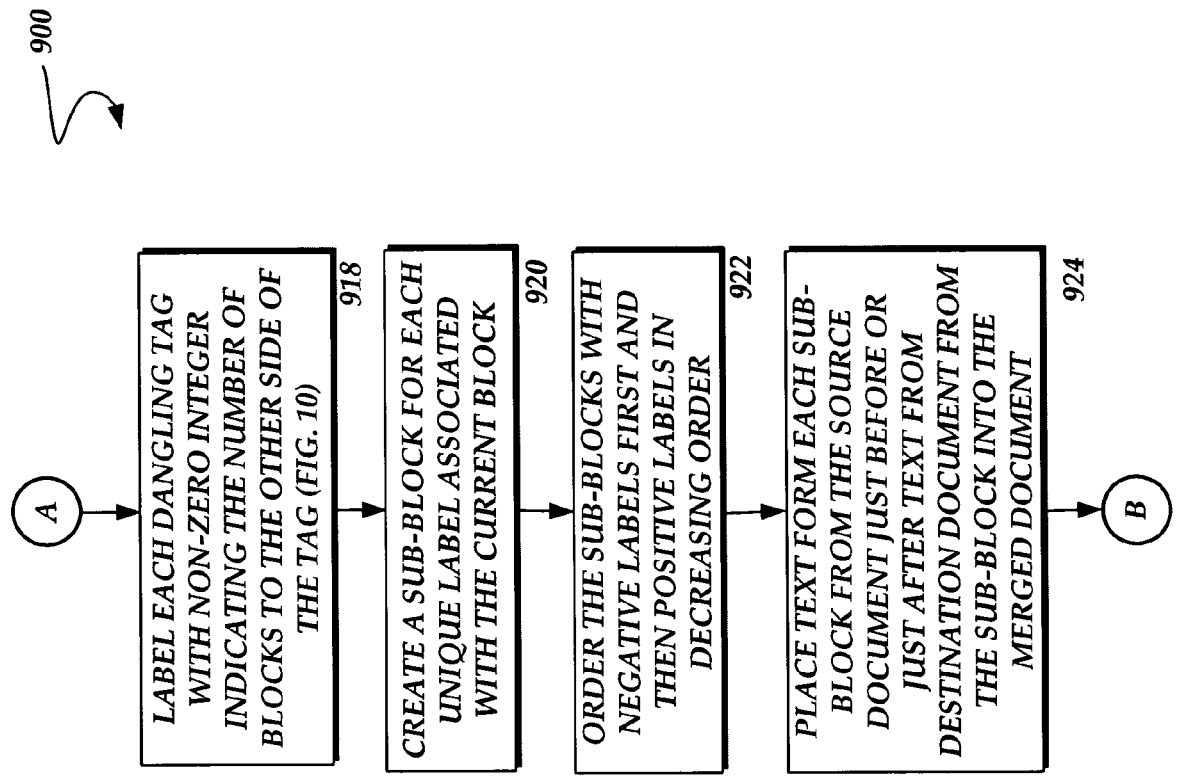

If, at decision operation 908, a dangling tag is identified in the current block, the routine 900 continues to operation 918 (shown in FIG. 9B). At processing operation 918, a non-zero integer label is generated for each dangling tag that identifies the number of blocks to the difference block containing the matching start or end tag. If the dangling tag has its end in the current block, then the corresponding start tag must be prior to the current difference block. Accordingly, the label for such a tag is a negative number. If a dandling tag has its start in the current block, then the corresponding end tag must be after the current difference block. Accordingly, the label for such a tag is a positive number.

Figure 10:
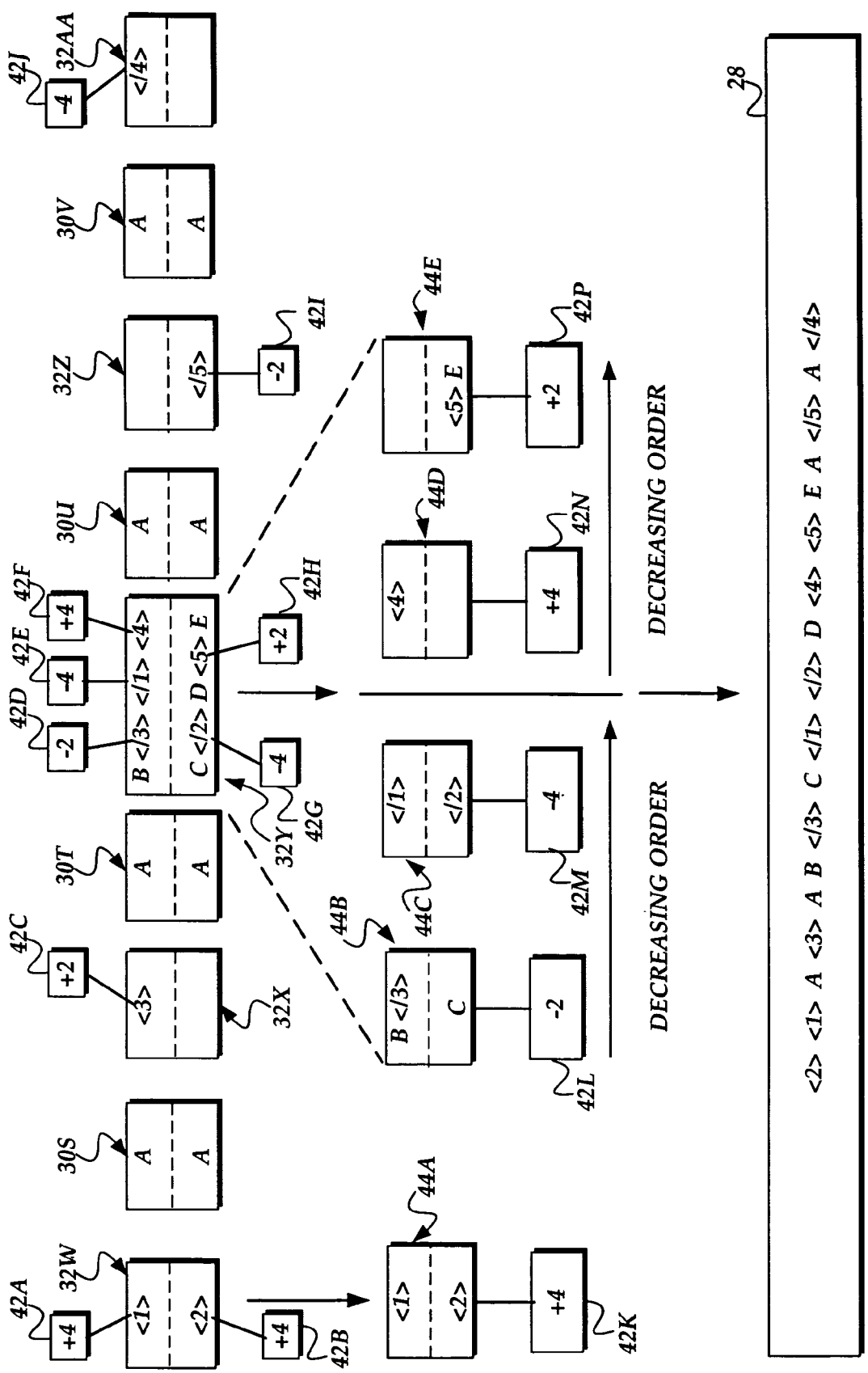

The process of labeling each of the tags is illustrated an example shown in FIG. 10. In this example, the difference block 32W contains a tag ("<1>") that begins in the block 32W but ends in the block 32Y. Accordingly, a label 42A is generated for the tag that indicates that the matching tag is +4 blocks away. Likewise, the corresponding end tag in the block 32Y is assigned a label 42E that indicates that the corresponding start tag is −4 blocks away. Similarly, a label 42C is assigned to the tag in block 32X that indicates that the matching tag is +2 blocks away and a label 42I is generated for the tag in block 32Z indicating that the matching tag is −2 blocks away. Other tags may be labeled in a similar fashion.

It should be appreciated by the reader that all dangling end tags occurring in one document must occur before all dangling start tags in that document. Otherwise, the tags would overlap in that document. So, in either document, all negative labels must occur before all positive labels. It should also be noted that in either document the negative labels must be in non-increasing order and the positive labels must be in non-increasing order. Any exception would imply that the tags overlap in the document.

Once the tags have been labeled, the routine 900 continues to operation 920, where a sub-block is created for each unique label associated with the current block. For instance, as shown in FIG. 10, the tags in block 32W were only assigned one unique label (+4). Accordingly, only one sub-block 44A is created for the block 32W. However, four unique labels (−2, +2, −4, +4) were assigned to tags in the block 32Y. Accordingly three sub-blocks, 44B–44E, are created for the block 32Y. All of the text that comes before any dangling tag is place in the first sub-block. Otherwise, all dangling tags are placed in the sub-block with the same label. All other text is placed in the sub-block according to the previous dangling tag.

Once the sub-blocks 44A–44E have been created, the routine 900 continues to operation 922, where the sub-blocks are ordered. In particular, the sub-blocks are ordered with the negative labels first, in decreasing order. The positive labels are then ordered in decreasing order. In this manner, the sub-blocks are ordered the same as the order of the dangling tags in either document. From operation 922, the routine 900 continues to operation 924.

At processing operation 924, text from each sub-block is copied into the merged document 28. In particular, content in the sub-block from the source document is copied into the merged document just before or just after the content from the destination document, depending upon the sign of the label assigned to the sub-block. If the sub-block has a negative label, content in the sub-block from the source document is copied into the merged document 28 just prior to content from the sub-block from the destination document. If the sub-block has a positive label, content in the sub-block from the source document is copied into the merged document 28 just after content from the sub-block from the destination document. By copying the content in this order, it can be assured that the merged document 28 will not contain poorly formed XML.

From operations 906, 910, and 924, the routine 900 continues to decision operation 912. At decision operation 912, a determination is made as to whether additional blocks remain to be copied into the merged document. If additional blocks remain to be processed, the routine 900 branches to process operation 914, where the next block to be processed is identified as the current block. The routine 900 then continues from operation 914 to decision operation 903. If, at decision operation 912, it is determined that no additional blocks remain to be processed, the routine 900 branches to operation 916, where it returns to block 520, shown in and described above with respect to FIG. 5.

Based on the foregoing, it should be appreciated that the various embodiments of the invention include a method, system, apparatus, and computer-readable medium for merging documents containing markup language tags. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for merging a source document into a destination document to create a merged document, wherein the source document or the destination document or both contain one or more markup language tags having a start tag or an end tag or both a start tag and an end tag, the method comprising:

comparing the source document and the destination document to identify one or more matching blocks and one or more difference blocks;

splitting all matching blocks that contain a markup language tag for which only a start tag or an end tag has been matched so that the matched markup language tags are no longer matched;

splitting all matching blocks that contain a markup language tag for which either the start tag or the end tag has been matched to a different tag in the other document so that the matched markup language tags are no longer matched;

splitting any matching blocks containing markup language tags that would create overlapping tags when merged; and merging the matching and difference blocks so that all markup language tags contained in the merged document are well formed by:

copying, for each matching block, text from one of the
following: the source document and the destination
document, in the matching block into the merged
document, copying, for each difference block, the text from one of
the following: the source document and the destination document, in the difference block into the
merged document if the difference block respectively
contains text only from one of the following: the
source document and the destination document, and copying, for each difference block, the text from the
source document and the destination document in the
difference block into the merged document if the
difference block contains text from both the source
document and the destination document wherein the
text from the source document is copied to a first
section of the merged document and the text from the
destination document is copied to a second section of
the merged document.

2. The method of claim 1, wherein splitting any matching blocks containing markup language tags that would create overlapping tags when merged comprises for each difference block:

determining whether a markup language tag from the
source document has a start tag but not an end tag in the
difference block;

in response to determining that the difference block
contains a start tag but not an end tag, locating the
furthest difference block containing the matching end
tag of such a tag in the source document;

identifying an inner range of matching and difference
blocks as each of the blocks between the current
difference block and the furthest difference block;

identifying an outer range of matching and difference
blocks as the current difference block and the furthest
difference block and each of the matching and difference blocks in between;

identifying each markup language tag that has a start tag
within the inner range and an end tag outside the outer
range and, for each identified markup language tag,
discarding all matching blocks within the inner range
prior to the start tag; and identifying each markup language tag that has an end tag
within the inner range and a start tag outside the outer
range and, for each identified markup language tag,
discarding all matching blocks within the inner range
after the end tag.

3. The method of claim 2, wherein merging the matching and difference blocks so that all markup language tags contained in the merged document are well formed further comprises, for each difference block:

creating a label for each markup language tag that has
only either a start tag or an end tag in the difference
block, the label comprising a non-zero integer identifying the number of blocks to the difference block
containing the matching start or end tag;

creating a sub-block for each distinct label, each sub-block containing the markup language tags and text
from either the source or destination document having
a corresponding label;

arranging in order each of the sub-blocks, with negative
labels first and then positive labels in decreasing order;
and copying text into the merged document from each sub-block, text from the source document being copied just
prior to or just after text from the sub-block in the
destination document.

4. The method of claim 3, wherein text is copied from each sub-blocks into the merged document in the arranged order.

5. The method of claim 4, wherein text in the sub-block from the source document is copied just prior to text from the sub-block from the destination document if the sub-block has a negative label.

6. The method of claim 5, wherein text in the sub-block from the source document is copied just after text in the sub-block from the destination document if the sub-block has a positive label.

7. The method of claim 6, wherein comparing the source document and the destination document to identify one or more matching blocks and one or more difference blocks comprises:

matching a markup language tag in the source document
to a markup language tag in the destination document
only if each aspect of the markup language tag in the
source document is identical to each aspect of the
markup language tag in the destination document.

8. A computer-readable medium which stores a set of instructions which when executed performs a method for merging a source document into a destination document to create a merged document, wherein the source document or the destination document or both contain one or more markup language tags having a start tag or an end tag or both a start tag and an end tag, the method executed by the set of instructions comprising:

comparing the source document and the destination document to identify one or more matching blocks and one
or more difference blocks;

splitting all matching blocks that contain a markup language tag for which only a start tag or an end tag has
been matched so that the matched markup language
tags are no longer matched;

splitting all matching blocks that contain a markup language tag for which either the start tag or the end tag
has been matched to a different tag in the other document so that the matched markup language tags are no
longer matched;

splitting any matching blocks containing markup language tags that would create overlapping tags when
merged; and merging the matching and difference blocks so that all
markup language tags contained in the merged document are well formed by interleaving text from the
source document and the destination document into the
merged document wherein well formed comprises that
each start tag in the markup language tags must have a
corresponding end tag and each end tag in the markup
language tags must have a corresponding start tag.

9. The computer-readable medium of claim 8, wherein splitting any matching blocks containing markup language tags that would create overlapping tags when merged comprises for each difference block:

determining whether a markup language tag from the
source document has a start tag but not an end tag in the
difference block;

in response to determining that the difference block
contains a start tag but not an end tag, locating the
furthest difference block containing the matching end
tag of such a tag in the source document;

identifying an inner range of matching and difference
blocks as each of the blocks between the current
difference block and the furthest difference block;

identifying an outer range of matching and difference
blocks as the current difference block and the furthest
difference block and each of the matching and difference blocks in between;

identifying each markup language tag that has a start tag
within the inner range and an end tag outside the outer range and, for each identified markup language tag, discarding all matching blocks within the inner range prior to the start tag; and identifying each markup language tag that has an end tag within the inner range and a start tag outside the outer range and, for each identified markup language tag, discarding all matching blocks within the inner range after the end tag.

10. The computer-readable medium of claim 9, wherein merging the matching and difference blocks so that all markup language tags contained in the merged document are well formed further comprises, for each difference block:

creating a label for each markup language tag that has only either a start tag or an end tag in the difference block, the label comprising a non-zero integer identifying the number of blocks to the difference block containing the matching start or end tag;

creating a sub-block for each distinct label, each sub-block containing the markup language tags and text from either the source or destination document having a corresponding label;

arranging in order each of the sub-blocks, with negative labels first and then positive labels in decreasing order; and copying text into the merged document from each sub-block, text from the source document being copied just prior to or just after text from the sub-block in the destination document.

11. The computer-readable medium of claim 10, wherein text is copied from each sub-blocks into the merged document in the arranged order.

12. The computer-readable medium of claim 11, wherein text in the sub-block from the source document is copied just prior to text from the sub-block from the destination document if the sub-block has a negative label.

13. The computer-readable medium of claim 12, wherein text in the sub-block from the source document is copied just after text in the sub-block from the destination document if the sub-block has a positive label.

14. The computer-readable medium of claim 13, wherein comparing the source document and the destination document to identify one or more matching blocks and one or more difference blocks comprises matching a markup language tag in the source document to a markup language tag in the destination document only if each aspect of the markup language tag in the source document is identical to each aspect of the markup language tag in the destination document.

15. A system for merging a source document into a destination document to create a merged document, wherein the source document or the destination document or both contain one or more markup language tags having a start tag or an end tag or both a start tag and an end tag, the system comprising:

a memory storage for maintaining a database; and a processing unit coupled to the memory storage, wherein the processing unit is operative to:

compare the source document and the destination document to identify one or more matching blocks and one or more difference blocks;

split all matching blocks that contain a markup language tag for which only a start tag or an end tag has been matched so that the matched markup language tags are no longer matched;

split all matching blocks that contain a markup language tag for which either the start tag or the end tag has been matched to a different tag in the other document so that the matched markup language tags are no longer matched;

split any matching blocks containing markup language tags that would create overlapping tags when merged; and merge the matching and difference blocks so that all markup language tags contained in the merged document are well formed by interleaving text from the source document and the destination document into the merged document wherein well formed comprising the matching and the difference blocks merged in an order such that no overlapping tags are present in the merged document wherein the processing unit being operative to merge the matching and difference blocks so that all markup language tags contained in the merged document are well formed comprises the processing unit is operative to;

process each matching block and difference block in order, copy, for each matching block, text from the source or destination document in the matching block into the merged document, and copy, for each difference block, the text from the source or destination document in the difference block into the merged document if the difference block contains text only from either the source or destination document.

16. The system of claim 15, wherein the processing unit is being operative to split any matching blocks containing markup language tags that would create overlapping tags when merged comprises, for each difference block, the processing unit is operative to:

determine whether a markup language tag from the source document has a start tag but not an end tag in the difference block;

in response to determining that the difference block contains a start tag but not an end tag, locate the furthest difference block containing the matching end tag of such a tag in the source document;

identify an inner range of matching and difference blocks as each of the blocks between the current difference block and the furthest difference block;

identify an outer range of matching and difference blocks as the current difference block and the furthest difference block and each of the matching and difference blocks in between;

identify each markup language tag that has a start tag within the inner range and an end tag outside the outer range and, for each identified markup language tag, discarding all matching blocks within the inner range prior to the start tag; and identify each markup language tag that has an end tag within the inner range and a start tag outside the outer range and, for each identified markup language tag, discarding all matching blocks within the inner range after the end tag.

17. The system of claim 16, wherein the processing unit being operative to merge the matching and difference blocks so that all markup language tags contained in the merged document are well formed further comprises, for each difference block, the processing unit is operative to:

create a label for each markup language tag that has only either a start tag or an end tag in the difference block, the label comprising a non-zero integer identifying the number of blocks to the difference block containing the matching start or end tag;

create a sub-block for each distinct label, each sub-block containing the markup language tags and text from either the source or destination document having a corresponding label;

arrange in order each of the sub-blocks, with negative labels first and then positive labels in decreasing order; and copy text into the merged document from each sub-block, text from the source document being copied just prior to or just after text from the sub-block in the destination document.

18. The system of claim 17, wherein text is copied from each sub-blocks into the merged document in the arranged order.

19. The system of claim 18, wherein text in the sub-block from the source document is copied just prior to text from the sub-block from the destination document if the sub-block has a negative label.

20. The system of claim 19, wherein text in the sub-block from the source document is copied just after text in the sub-block from the destination document if the sub-block has a positive label.

* * * * *